(12) United States Patent
Holland

(10) Patent No.: US 6,270,233 B1
(45) Date of Patent: Aug. 7, 2001

(54) ILLUMINATED BUCKET

(76) Inventor: Jack Holland, 5612 Carthage Ave., Cincinnati, OH (US) 45212

( * ) Notice: Subject to any disclaimer, the term of this patent is extended or adjusted under 35 U.S.C. 154(b) by 0 days.

(21) Appl. No.: 09/420,470

(22) Filed: Oct. 19, 1999

(51) Int. Cl.[7] ............................... F21V 33/00; F21L 4/00
(52) U.S. Cl. ..................... 362/154; 362/186; 362/311; 362/808
(58) Field of Search ................... 362/124, 154, 362/156, 186, 253, 399, 808, 311

(56) References Cited

U.S. PATENT DOCUMENTS

| 1,183,268 | * | 5/1916 | Baldwin et al. | 362/156 |
|---|---|---|---|---|
| 1,750,856 | * | 3/1930 | Patche | 362/186 |
| 3,808,416 | * | 4/1974 | Pottratz | 362/156 |
| 4,714,985 | * | 12/1987 | Hickey | 362/154 |
| 4,802,071 | * | 1/1989 | Schuster | 362/154 |
| 4,926,296 | * | 5/1990 | Blume et al. | 362/156 |
| 5,222,802 | * | 6/1993 | Beck | 362/156 |
| 5,911,501 | * | 6/1999 | Katz | 362/267 |

* cited by examiner

*Primary Examiner*—Alan Cariaso
(74) *Attorney, Agent, or Firm*—Neal O. Willmann

(57) ABSTRACT

This disclosure relates to a bucket having an illumination means and decorated to be used primarily by trick-or-treaters for the accumulation of treats on All Hallow's Eve. This bucket, when the illumination means is activated, will illuminate the path of the child holding the bucket; and, by means of a flange encircling the source of illumination, absorb lateral light rays producing a radiant glow that will give the bucket, and the "goblin" carrying it, a "safety zone" glow and an aesthetic effect.

5 Claims, 1 Drawing Sheet

U.S. Patent        Aug. 7, 2001        US 6,270,233 B1
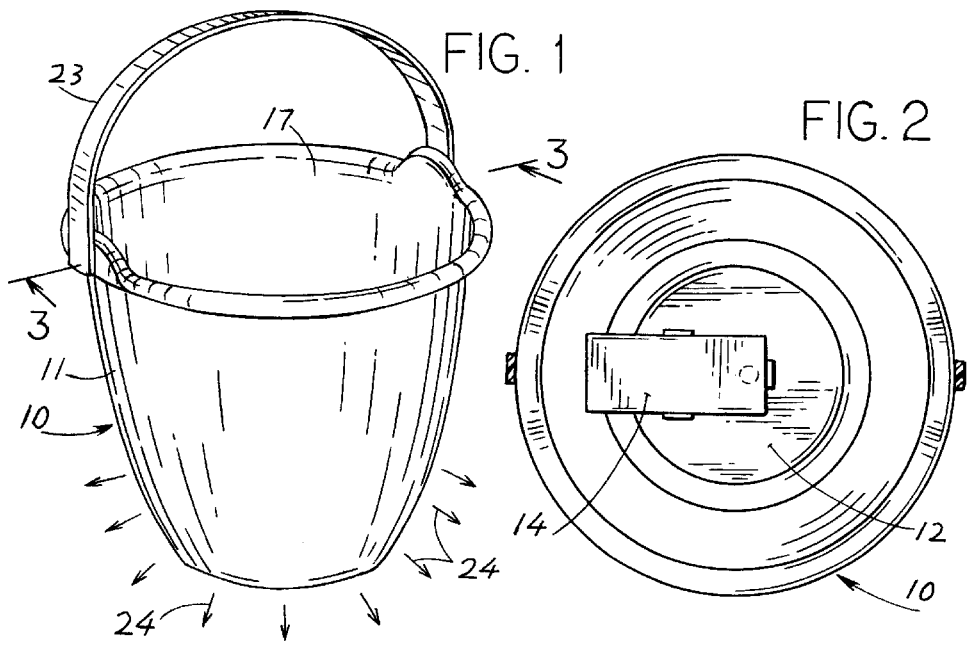
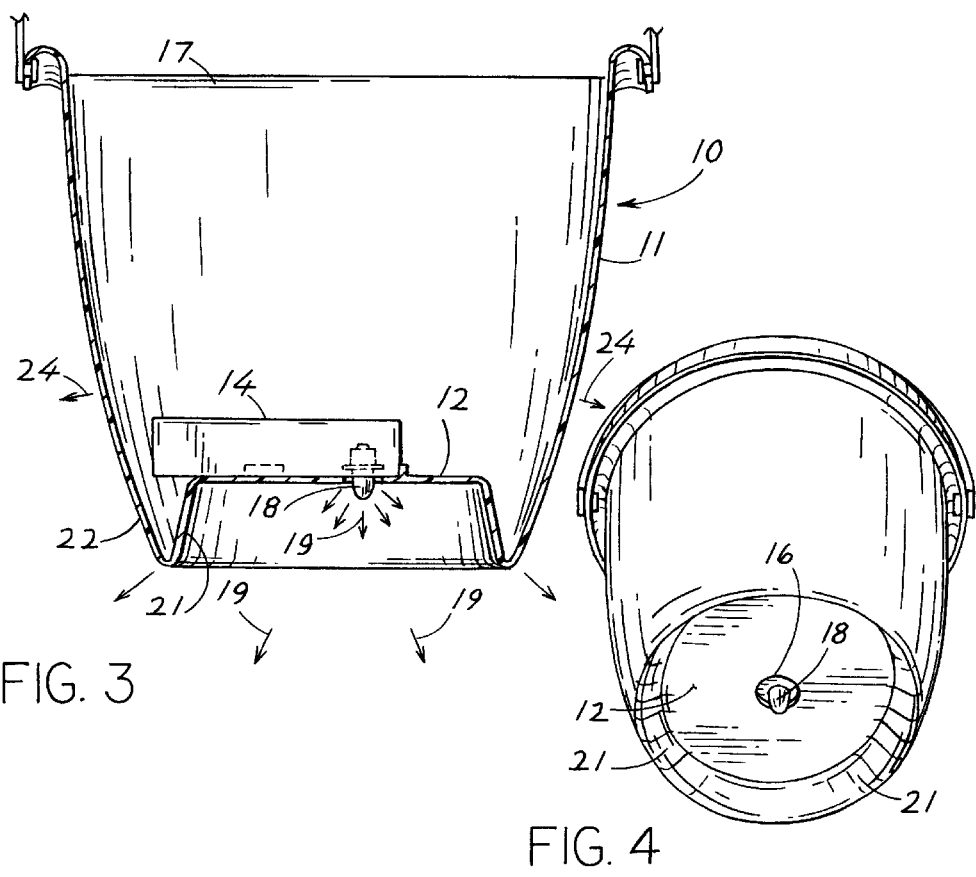

ILLUMINATED BUCKET

FIELD OF THE INVENTION

This disclosure relates generally a bucket, or the like, that can be readily molded from a translucent plastic material, and wherein the bucket is provided with an illumination means, which, when activated, will illuminate the path of anyone carrying the bucket in the prescribed or typical manner and will radiate through the translucent bucket to provide a "glow" from the bucket effecting aesthetic and safety enhancements.

More specifically, the disclosed bucket has been designed for the use of "ghosts and goblins" to increase the safety and enjoyment of their Halloween experience. Clearly, the bucket is to be used for the accumulation and temporary storage of treats acquired in the customary and traditional manor on that all-important holiday that is second only to Christmas in the eyes of American children. When used as intended, the disclosed bucket will be decorated in the traditional Halloween colors of orange and black and typically be designed to resemble a jack-o-lantern and/or display a variety of Halloween characters and/or motifs. But furthermore and more important, the bucket will be illuminated from an internally situated illumination means that will cast light vertically out an orifice in the bottom of the bucket to illuminate the path of the child carrying the bucket and laterally, through a flange on the bucket, to produce a muted "safety glow" from the bucket.

DESCRIPTION OF THE PRIOR ART

U.S. Pat. No. 5,911,501 to Katz, dated Jun. 15, 1999, relating to a home decorating system, describes the employment of plastic figurines, generally depicting characters or accouterments consistent with a particular holiday theme, and suggests that the figurines can be fitted with electric lights to provide a decorative illuminated seasonal display.

U.S. Pat. No. 5,222,802 to Beck, issued Jun. 29, 1993, describes an internally illuminated yard bag that can be fashioned into the shape of a jack-o-lantern. The bag is designed to be translucent to permit the transmission of light from the source of illumination within the bag to observers located external to the bag.

U.S. Pat. No. 4,926,296 to Blume et al. dated May 15, 1990, describes an illuminated bag suitable for collecting treats on Halloween. The illumination of this bag is effected by a battery powered light that, when lit, will provide both decorative and safety functions.

However, notwithstanding the many clever and desirable features of the illuminated devices and containers described in the foregoing U.S. Patents, there are several inventive attributes that have heretofore been unavailable and undisclosed. Those attributes are disclosed and set-forth in considerable detail in this specification.

SUMMARY OF THE INVENTION

Specifically, what is disclosed herein is a bucket, or the like, for accumulating and carrying treats, and the like, said bucket capable of being illuminated by an illumination means, which when activated will emit an aesthetic safety glow from the bucket and illuminate the walking path of anyone carrying said bucket, wherein said bucket comprises:

a continuous lateral wall defining said bucket said wall molded from a translucent material and having an upper opening to provide access to the interior of said bucket;

a bottom platform having a perimeter defined by said wall and supporting the contents of said bucket said platform having a small aperture generally located in the middle of said platform;

an illumination means consisting of a power source and a bulb generally situated on the inner surface of said platform and wherein said bulb extends through said small aperture in said platform; and a translucent flaring flange continuous with said wall, encircling and extending below said platform, providing a support for said bucket, and radiating a glow from the bulb when activated.

BRIEF DESCRIPTION OF THE DRAWING

FIG. 1 is a raised perspective view of the disclosed bucket.

FIG. 2 is a top plan view of the disclosed bucket.

FIG. 3 is an elevational view of the disclosed bucket in cross-section taken along line 3—3 of FIG. 1.

FIG. 4 is a perspective view from the bottom of the disclosed bucket.

DESCRIPTION OF THE PREFERRED EMBODIMENT

A preferred embodiment of the disclosed bucket 10 can be seen in its entirety in the perspective view depicted in FIG. 1 of the drawing. It is preferably molded from a plastic material that is translucent and easily colored or painted. Because the preferred use of the disclosed buckets will be for the accumulation of treats during the trick-or-treat aspect of Halloween, it is likely that the bucket will be colored or decorated in the traditional Halloween colors of orange and black. The primary structural and defining aspect of the bucket 10 will be a wall 11. The wall is continuous on all sides of the bucket and will have an upper opening 17 for the deposit and removal of treats. The treats will be contained within the bucket by the wall and a platform section 12, which will serve primarily as the bottom of the bucket and as a support for the illumination means. The illumination means will consist primarily of a power source and a light bulb 18. In FIG. 2 of the drawing, the power source is depicted by the battery case 14, which, to reiterate, is preferably situated on the platform 12.

The battery, or batteries, situated in the power source case 14, when drawn upon will activate and illuminate the bulb 18. In its most desired position, the bulb, while in electrical contact with the power source, will extend through a small orifice 16 in the platform so as to release most, if not all, of its radiant energy on the exterior of the bucket. In so doing, radiant energy will be directed in an arc of almost 360° from the bulb 18 beneath the bucket. And much of that light will radiate from the bottom of the platform 12 to provide illumination on the walking path of the individuals, usually children, carrying said bucket 10, typically by a bail or handle 23. These vertical light rays are identified in FIG. 3 by the arrows 19. Additionally, lateral light rays will also be emitted from the bulb 18 where they will encounter the flange portion 22 of the bucket 10. The flange portion, preferably molded from the same translucent material as the wall of the bucket, will absorb the lateral rays, to a certain extent, and allow them to pass through the bucket in the form of a soft glow, typically with the same color as the bucket.

The flange 22 is typically formed as a continuation of the wall 11 of the bucket 10 and preferably extends past the platform for a short distance so that it can "collect" most of the lateral light waves being emitted from the bulb 18. Typically, the flange 22 will be molded to be contiguous with the platform 12 and will have an inner surface 21, which, by shielding a direct lateral view of the bulb, will be the first portion of the flange to encounter the emitted light rays from the bulb.

It bears repeating that when the light bulb 18 is activated by the batteries in the power source, the emitted light will serve two functions: Vertical light rays, preferably from a pre-focused bulb, will illuminated the walking path of the holder of the bucket and lateral light rays will be "caught" by the downwardly extending flange 22, absorbed to some extent, and re-emitted as a soft, muted glow 24. The glow has a twofold purpose: It will alert others that there are children in the vicinity engaged in the practice of trick-or-treating and, of course, the glow will provide an aesthetic effect, which is a major part of the Halloween experience.

While the foregoing is a complete and detailed description of the preferred embodiment of the disclosed novelty item, numerous variations and modifications may also be employed to implement the all-important purpose of the invention without departing from the spirit of the invention; and, therefore the elaboration provided should not be assumed to limit, in anyway, the scope of the invention which is fairly defined by the appended claims.

What I claim is:

1. A bucket for accumulating and carrying treats and the like capable of being illuminated, which when activated will emit a glow from the bucket and illuminate the walking path of anyone carrying said bucket wherein said bucket comprises:

- a continuous lateral wall defining said bucket said wall molded from a translucent material and having an upper opening to provide access to the interior of said bucket;
- a bottom platform having a perimeter defined by said wall and supporting the contents of said bucket said platform having a small aperture generally located in the middle of said platform;
- an illumination means consisting of a power source and a bulb generally situated on the inner surface of said platform and wherein said bulb extends through said small aperture in said platform; and
- a translucent flange continuous with said wall, encircling and extending below said platform, providing a support for said bucket and radiating a glow from the activated bulb.

2. The bucket according to claim 1 wherein said flange shields the direct view of said bulb.

3. The bucket according to claim 1 having a bail for holding and carrying said bucket.

4. The bucket according to claim 1 wherein the bulb is pre-focused.

5. The bucket according to claim 1 wherein the continuous lateral wall is molded to resemble a jack-o-lantern.

* * * * *